United States Patent [19]

Shaw, Jr.

[11] 4,440,559

[45] Apr. 3, 1984

[54] APPARATUS FOR SENSING A GLASS RIBBON EDGE AND METHOD OF USE

[75] Inventor: Hugh E. Shaw, Jr., Crystal City, Mo.

[73] Assignee: PPG Industries, Inc., Pittsburgh, Pa.

[21] Appl. No.: 393,912

[22] Filed: Jun. 30, 1982

[51] Int. Cl.³ .............................................. C03B 18/06
[52] U.S. Cl. ..................................... 65/99.5; 65/99.6; 65/182.3; 65/182.4
[58] Field of Search ...................... 65/99.3, 99.5, 99.6, 65/182.3, 182.4

[56] References Cited

U.S. PATENT DOCUMENTS

| | | | |
|---|---|---|---|
| 3,482,954 | 12/1969 | Yuen | 65/29 |
| 3,500,548 | 3/1970 | Mitsumo | 33/174 |
| 3,528,795 | 9/1970 | Swillinger | 65/182 |
| 3,794,477 | 2/1974 | Farabaugh et al. | 65/158 |
| 3,805,072 | 4/1974 | Goerens et al. | 250/342 |
| 3,977,858 | 8/1976 | Taguchi | 65/158 |
| 3,998,616 | 12/1976 | Farabaugh | 65/29 |
| 4,008,062 | 2/1977 | Nishikori et al. | 65/158 |
| 4,337,076 | 6/1982 | Shaw | 65/29 |

*Primary Examiner*—Arthur D. Kellogg
*Attorney, Agent, or Firm*—Donald Carl Lepiane; Rita M. Irani

[57] ABSTRACT

Nip width of a glass ribbon advancing on a molten metal bath is determined by repeatedly, at selected intervals, advancing an edge detector from a first home position toward and into contact with the ribbon edge and then back to a second home position. The first and second home positions are compared at the end of each interval to determine nip width and/or change in nip width. The facilities for determining nip width include a detector responsive to fluid pressure changes. Facilities are also taught relating to measurement of substrate displacements by contacting the substrate edge with a pivotal member to activate an electrical system.

13 Claims, 12 Drawing Figures

APPARATUS FOR SENSING A GLASS RIBBON EDGE AND METHOD OF USE

BACKGROUND OF THE INVENTION

1. Field of the Invention

This invention relates to an edge sensing apparatus, and more particularly, to an apparatus for sensing the edge of a glass ribbon as it advances on a molten metal bath through a forming chamber.

2. Discussion of the Technical Problems and Presently Available Edge Sensing Apparatus In the manufacture of flat glass, batch materials fed into the upstream end of the melter or furnace melt into raw molten glass as they advance downstream through the melter and thereafter the raw molten glass is refined. The refined molten glass exits at the downstream end of the furnace between a tweel and a glass supporting member e.g., a lip or threshold onto a pool or bath of molten metal. The tweel is mounted for movement toward and away from the glass supporting member to meter or control the flow of molten glass onto the pool of molten metal. The refined molten glass as it advances downstream on the molten metal pool is controllably cooled to form a glass ribbon which is lifted from the pool by lift out rolls and moved through an annealing lehr.

When supported on the molten metal pool, the molten glass naturally stabilizes at a thickness of about 0.271 inch (0.69 millimeter). This thickness is called equilibrium thickness and in the absence of a controlled application of forces to the advancing molten glass during forming, the subsequently formed glass ribbon has this thickness. For example, a glass ribbon less than equilibrium thickness can be obtained by pulling the molten glass or heated glass ribbon by a force downstream of the delivery channel or near the lehr end (often called lehr force) which stretches or attenuates the glass ribbon and causes it to move faster than when a glass ribbon of equilibrium thickness is produced. The glass ribbon not only becomes thinner, it also becomes narrower unless the edges of the ribbon are restrained, e.g., by edge roll machines or attenuating apparatus such as the type taught in U.S. Pat. Nos. 3,709,673 and 3,998,616.

In general, the attenuating apparatus includes an attenuating wheel that engages the upper surface of the body of hot glass at an angle. The angle subtended by the axis of the attenuating wheel and the glass path defines an angle of attenuation. A pair of opposed attenuating apparatus have their respective attenuating wheels applying longitudinal and transverse forces at the ribbon edge to maintain the ribbon within a desired width. During the attenuation of the ribbon, it is important to engage the ribbon a sufficient distance from the ribbon edge to have positive traction while minimizing the distance between the wheel and adjacent ribbon edge to reduce ribbon edge loss. The ribbon portion between the edge and point of attenuating wheel engagement is usually referred to as nip width. Techniques employed for maintaining an acceptable nip width include mounting a ribbon edge detector or nip sensor on an extending arm of the attenuating apparatus adjacent the wheel.

U.S. Pat. No. 3,500,548 teaches that the edge of a glass ribbon is detected by suspending a plurality of spaced electrodes at each opposite side of the ribbon. The electrodes conduct current when in contact with the molten metal bath. When the ribbon width decreases, one of the spaced electrodes not supported on the glass contacts the molten metal bath. The resultant electric current of each one of opposed edge sensors is monitored to determine the ribbon width. A limitation of the above technique is that the electrodes are spaced from one another and therefore the actual ribbon width is difficult to determine when the ribbon edge is between spaced electrodes. In U.S. Pat. No. 3,482,954 the ribbon edge is sensed by projecting an annular gas stream toward the ribbon edge and sensing the back pressure. A limitation of this technique is that air is directed onto the molten metal pool and may result in turbulence that may detrimentally effect the optical quality of the subsequently formed glass.

In U.S. Pat. No. 3,805,072 a glass ribbon edge detector includes scanning telescopes each having a pair of cells responsive to infrared energy. The object ends of the telescopes are mounted above the ribbon edge in a home position as determined by sensed infrared energy. When the ribbon shifts in a direction generally transverse to its direction of motion, the output of the cells varies and the telescopes move in response thereto until the telescopes are each in the home position. U.S. Pat. No. 3,998,616 teaches the use of a plurality of photodetectors which are mounted over the edge of the ribbon and the molten metal bath. Changes in output of the photodetectors indicate the position of the glass ribbon within the chamber. In U.S. Pat. No. 4,008,062 the radiation receiving end of a radiation pyrometer is inserted transversely of and above a glass ribbon supported on a molten metal bath. The radiation receiving edge reciprocally moves until a rapid temperature increase is sensed by the pyrometer to indicate the edge of the ribbon. In U.S. Pat. No. 3,977,858 two optical detectors move in a direction perpendicular to that of a glass ribbon advancing on a roller conveyor. The detector at each side of the ribbon stops upon detecting its respective ribbon edge. The distance between the detectors which corresponds to the width of the ribbon is indicated by an electrical signal. A limitation of the above type ribbon edge detectors is that the sensing elements are usually mounted in a water cooled housing to prevent thermal damage to the sensing elements in the housing. Mounting a water cooled housing in a heated glass forming chamber necessitates specially designed equipment. Further, condensates may form on water cooled surfaces within the forming chamber and excess condensates may drop onto the ribbon surface causing surface defects. Still further, initial insertion of the water cooled members may upset the thermal equilibrium in the forming chamber.

In view of the above, it would be advantageous to provide a ribbon edge detector that does not have the limitations of the presently available edge detectors.

SUMMARY OF THE INVENTION

This invention relates to a method of measuring substrate displacement, e.g., the edge of a glass ribbon supported on a molten metal bath in a glass forming chamber, and includes the steps of advancing an edge detector in a first direction along a path into contact with the substrate edge and thereafter, moving the edge detector in a second opposite direction along the path a predetermined distance into a first home position. At selected intervals, the advancing step is repeated. Thereafter, the moving step is practiced to move the edge detector in the second direction the predetermined amount into a second home position. The distance and direction along the path of the first and second home positions is measured to determine displacement of the ribbon edge along the path.

This invention also relates to an apparatus for measuring the substrate displacements and includes facilities for detecting the substrate edge and facilities for advancing the detecting means in the first direction along the path to contact the substrate edge and in an opposite second direction along the path, a predetermined distance into a home position. Facilities are provided for activating the advancing facilities at selected intervals. Measuring facilities are responsive to the detecting facilities to measure the differences between the distance and the direction of the detecting facilities along the path when the detecting facilities are in the home position to measure substrate displacement.

The instant invention provides a method and apparatus for determining ribbon displacement while permitting the ribbon to flow between intervals. More particularly, the edge detector is moved into contact with the ribbon edge to determine the position of the ribbon edge and thereafter is backed up a predetermined amount for example, about 1 inch (2.54 centimeters). At a selected interval, the edge detector is once again moved forward to contact the ribbon edge after which the edge detector is moved back the predetermined distance, for example, 1 inch (2.54 centimeters). The position of the edge detector after each measuring step is compared to determine lateral ribbon displacement. By providing the edge detector a spaced distance from the glass as it advances along the molten metal bath, there is no restriction or contacting of the ribbon. Further, the test is made at selected intervals and is a contacting test which is more accurate than those which are noncontacting, such as using infrared detectors.

DESCRIPTION OF THE INVENTION

Figure 1:
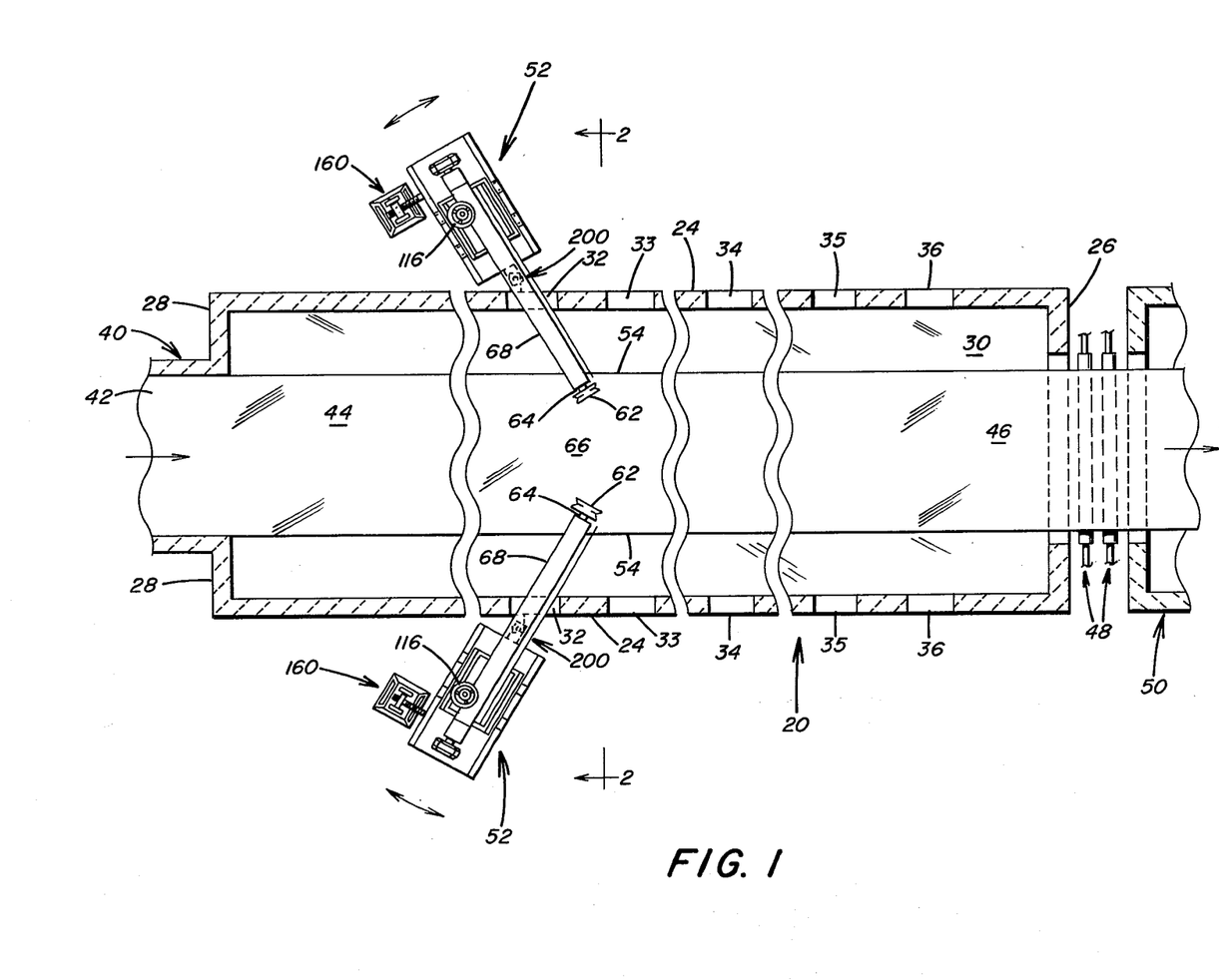
FIG. 1 is a fragmented, plan view of a flat glass forming chamber having portions removed for purposes of clarity illustrating a pair of attenuating apparatus having a ribbon edge detector incorporating features of the invention.
Figure 2:
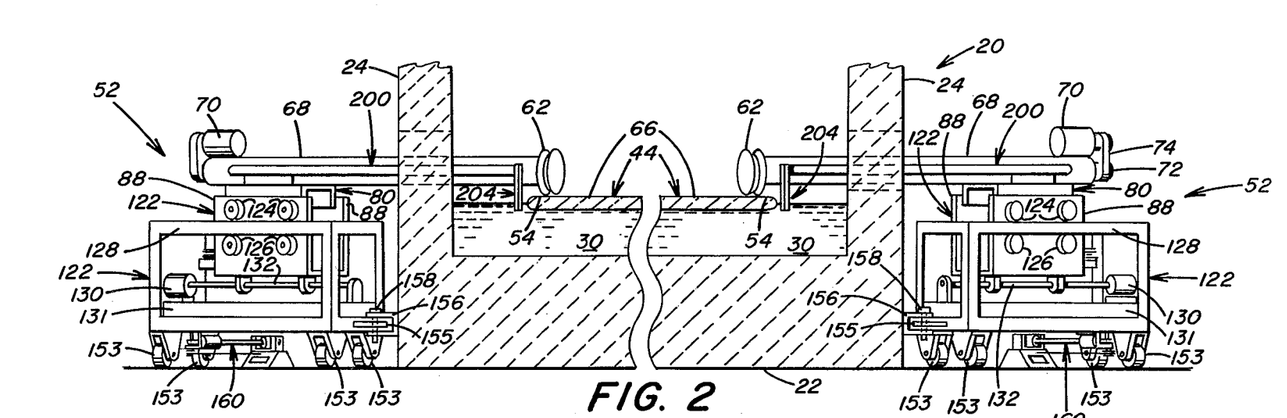
FIG. 2 is a view taken along line 2—2 of FIG. 1.

Referring to FIG. 1 there is shown a section of the interior of a flat glass forming chamber 20 of the type known in the flat glass making art. Referring to FIGS. 1 and 2 as needed, the chamber 20 includes a refractory bottom 22, refractory side walls 24, refractory exit lip 26 and refractory back walls 28 to form a container for a bath or pool 30 of supporting molten metal, e.g., tin or an alloy of tin. The chamber 20 has a plurality of opposed bays, for example bays 32-36, to provide access to the interior of the float chamber 20. The chamber 20 is connected to a delivery channel 40 through which molten glass 42 is moved at a controlled rate in any convenient manner onto the pool of molten metal 30 to form a body of hot glass 44 on the molten metal 30. As the body of hot glass 44 moves downstream from the delivery channel 40 in the direction of the arrow, the body of hot glass 44 undergoes attenuation and cooling to form a dimensionally stable glass ribbon 46. The glass ribbon 46 is moved over the exit lip 26 of the chamber 20 and conveyed by way of rollers 48 into an annealing lehr of the type used in the art.

As will become apparent, the invention is not limited to any particular type of glass forming chamber, for example, the invention may be practiced using a glass making apparatus of the type taught in U.S. Pat. No. 3,843,346, which teachings are hereby incorporated by reference.

Shown in FIGS. 1 and 2 is a pair of attenuating apparatus 52 for applying longitudinal and transverse forces adjacent edges 54 of the body of hot glass or glass ribbon 44 as it moves downstream through the chamber 20 to controllably reduce the ribbon thickness. As can be appreciated by those skilled in the art, the reduction in the ribbon thickness may be made with or without a change in ribbon width. Applying longitudinal and transverse forces to the body of hot glass makes the body thinner. The attenuation of the hot glass body may be accomplished using any convenient attenuating apparatus and is not limiting to the invention. In general, the attenuating apparatus 52 includes attenuating facilities, e.g., a wheel 62 securely mounted on the end of a shaft 64 (shown in FIG. 1). The attenuating wheel 62 engages top surface 66 of the body 44 of the hot glass adjacent the edge 54 to apply forces which attenuate the body 44. The shaft 64 is advantageously rotatably mounted in a water cooled barrel 68 in any convenient manner. A wheel, shaft and barrel arrangement that may be used in the practice of the invention is taught in U.S. Pat. No. 3,709,673, which teachings are hereby incorporated by reference.

Figure 3:
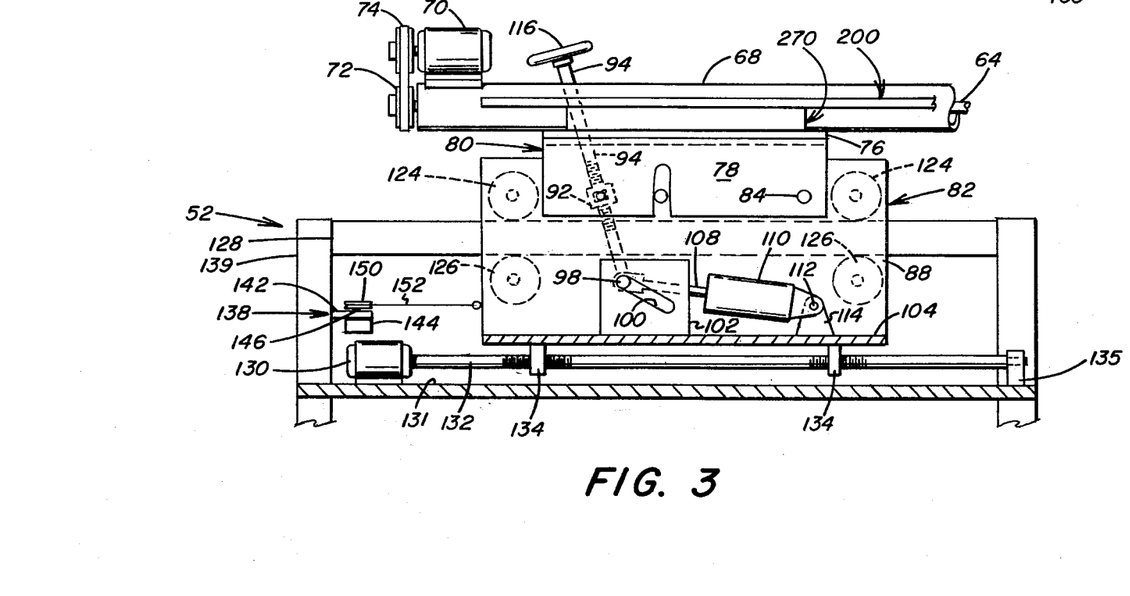
FIG. 3 is an exploded side elevated view having portions removed for purposes of clarity, of the carriage mechanism of the attenuating apparatus incorporating features of the invention.
Figure 4:
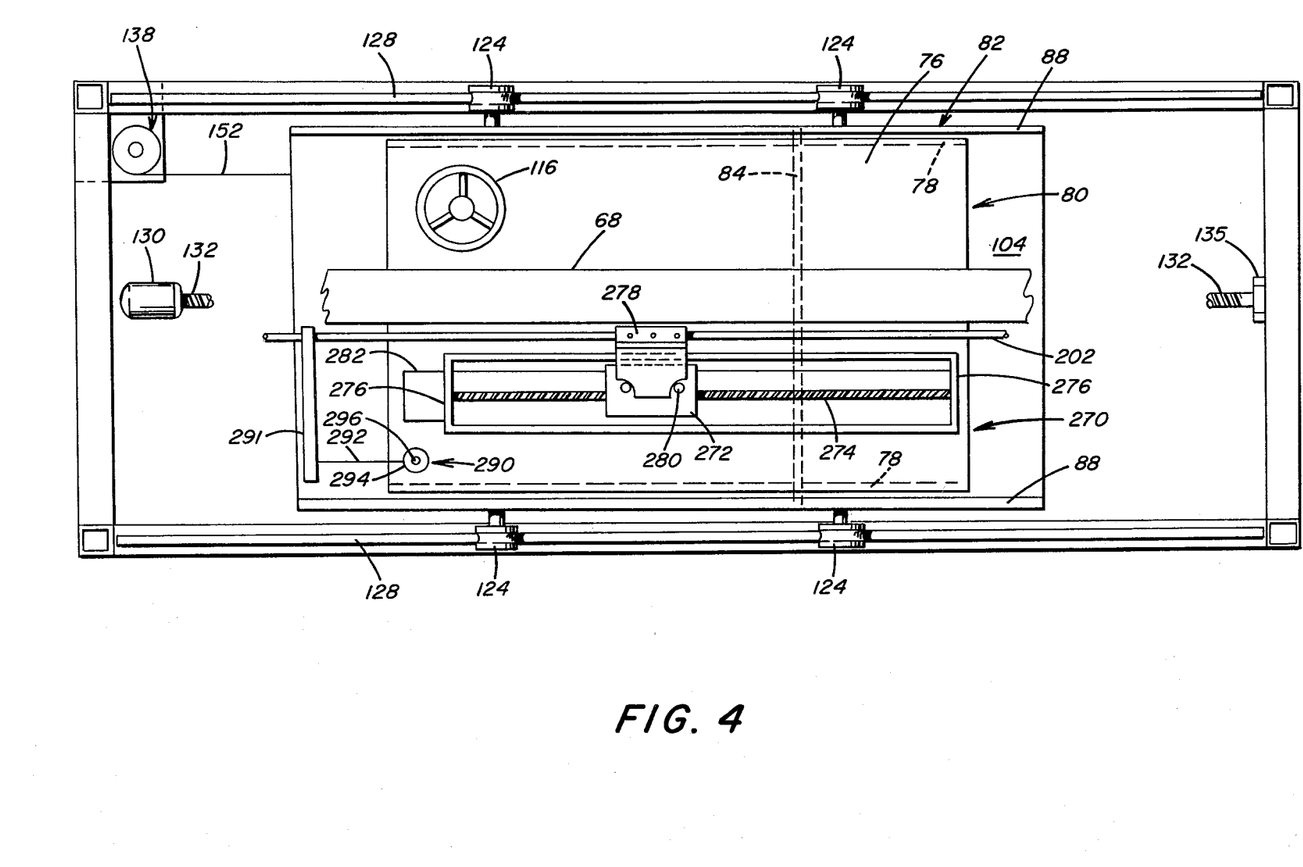
FIG. 4 is a plan elevated view of FIG. 3 having portions removed for purposes of clarity.

Referring now to FIGS. 3 and 4 as required, mounted on the barrel in any convenient manner is a variable speed motor 70. The motor 70 is operatively connected to drive wheel 72 by a drive belt 74 to rotate the shaft 64 to rotate its respective attenuating wheel 62 at a selected speed. The barrel 68 is advantageously mounted to a plate 76. A pair of opposed legs 78 (one only shown in FIG. 3) are mounted to the plate 76 to form a generally inverted U-shaped member 80. The member 80 is pivotally mounted in any convenient manner to a carriage 82, e.g., an upright U-shaped member for raising and lowering the barrel 68 toward and away from the top surface 66 of the body of hot glass 44 to move the attenuating wheel 62 into and out of engagement respectively, with the body of hot glass. For example, the member 80 is mounted between side walls 88 of the carriage 82 (FIG. 4). A shaft 84 has its ends mounted through the side walls 88 of the carriage 82 and the legs 78 of the member 80. Pivotally mounted between the legs 78 of the member 80 is a nut 92 (shown only in FIG. 3). A threaded shaft 94 passing through the plate 76 of the member 80 adjacent one side of the barrel 68 as shown in FIG. 4 is threaded through the nut 92 and has an end pivotally mounted to a shaft 98 as shown in FIG. 3. The shaft 98 has its ends slidably mounted in a groove 100 of opposed plates 102 (only one shown in FIG. 3) mounted in spaced relation on the base 104 of the carriage 82. Piston 108 of air cylinder 110 is pivotally mounted to the shaft 98 in any convenient manner. The end of the air cylinder 110 is pivotally mounted at 112 to a plate 114 secured to the base 104 of the carriage 82.

Movement of the piston 108 into and out of the air cylinder 110 provides course adjustment of the attenuating wheel 62 relative to the top surface 66 of the body of hot glass 44. For example, when the piston 108 moves out of the cylinder 110, the shaft 98 slides upward in the groove 100 to move the threaded shaft 94 upward as viewed in FIG. 3. As the threaded shaft 94 is urged upward, the member 80 is pivoted in a clockwise direction as viewed in FIG. 3 to move the attenuating wheel 62 toward the surface 66 of the body of hot glass 44. When the piston 108 is retracted into the cylinder 110, the member 80 moves in a counterclockwise direction as viewed in FIG. 3 to move the attenuating wheel 62 away from the top surface 66 of the body of hot glass 44. For fine adjustment, for example, to position the wheel 62 on the top surface 66 of the body of glass, the threaded shaft 94 is rotated, e.g., by hand wheel 116 in a first direction which pivots the member in a clockwise direction as viewed in FIG. 3 to move the wheel 62 into engagement with the top surface 66 of the body of hot glass 44.

The carriage 82 is conveniently mounted for reciprocal movement toward and away from the chamber 20 on a base 122. For example, the outer surface of each of the side walls 88 of the carriage 82 is provided with a pair of upper wheels 124 and lower wheels 126 positioned about adjacent horizontal member or guide rail 128 of the base 122 (see FIGS. 2 and 3). A motor 130 advantageously mounted on platform 131 of the base 122 is connected to one end of a threaded shaft 132 as shown in FIG. 3. The shaft 132 passes through a pair of spaced nuts 134 securely mounted on the underside of the carriage 82. The other end of the shaft 132 is conveniently rotatably mounted in bearing block 135. Referring now to FIG. 2, rotating the shaft 132 in the first direction moves the carriage 82 along the guide rails 128 to move the barrel 68 into the forming chamber 20, i.e., to move the wheel 62 away from the inner surface of adjacent side walls 24 of the float chamber over the glass ribbon 44. Rotating the shaft 132 in an opposite or second direction moves the carriage 82 along the guide rails 128 to move the barrel 68 out of the float chamber, i.e., to move the wheel 62 toward the inner surface of the adjacent wall 24 of the float chamber 20.

With specific reference to FIG. 3, a linear movement monitorial device 138 monitors the movement and direction of the carriage 82. The monitorial device 138 is conveniently mounted to standard 139 of the base 122 by a plate 142. The device 138 includes a potentiometer 144 having a stem 146 passing through and rotatably mounted on the plate 142. A spring biased wheel 150 is secured to the stem 146. A cable 152 had one end secured to the wheel 150 with a portion of the cable 152 rolled up on the wheel 150. The other end of the cable 152 is conveniently secured to the carriage 82. A voltage is conveniently impressed across the potentiometer 144 which is proportional to the length of the cable 152 when the carriage 82 is the maximum distance from the standard 139. As the carriage 82 moves toward the forming chamber 20 as previously discussed, the cable 152 is pulled from the wheel 150 against the biasing action of the spring biased wheel 150. As the wheel 150 rotates, the voltage output of the potentiometer 144 increases. As the carriage moves away from the forming chamber 20, the wheel 150 rotates to reel in the cable 152 as the voltage output of the potentiometer 144 decreases. Monitoring the voltage output of the potentiometer 144 can indicate the amount and direction of displacement of the carriage 82.

Linear movement monitorial devices of the type discussed above are taught in U.S. Pat. No. 3,998,616, which teachings are hereby incorporated by reference, and are used to determine the position of the ribbon within the forming chamber and the width of the ribbon.

Referring now to FIG. 2, the base 122 has wheels 153 and a tongue 155 secured in hitch 156 mounted to the chamber side walls 24 by a pin 158 for movement of the base 122 along an arcuate reciprocating path shown by the arrows in FIG. 1. Moving the base 122 along the arcuate path provides adjustment of the attenuating angle of the attenuating wheel 62 with respect to the glass ribbon 44 for adjusting opposed lateral forces to increase or decrease the ribbon width. The base 122 may be conveniently moved along the arcuate path by motor drive apparatus 160 and the direction and distance measured by an arcuate monitorial device similar to the linear monitorial device 138. A motor drive apparatus and arcuate monitorial device that may be used in the practice of the invention is taught in U.S. Pat. No. 3,998,616, at column 9, lines 9–31.

Figures 5, 6, 7, 8, 9:
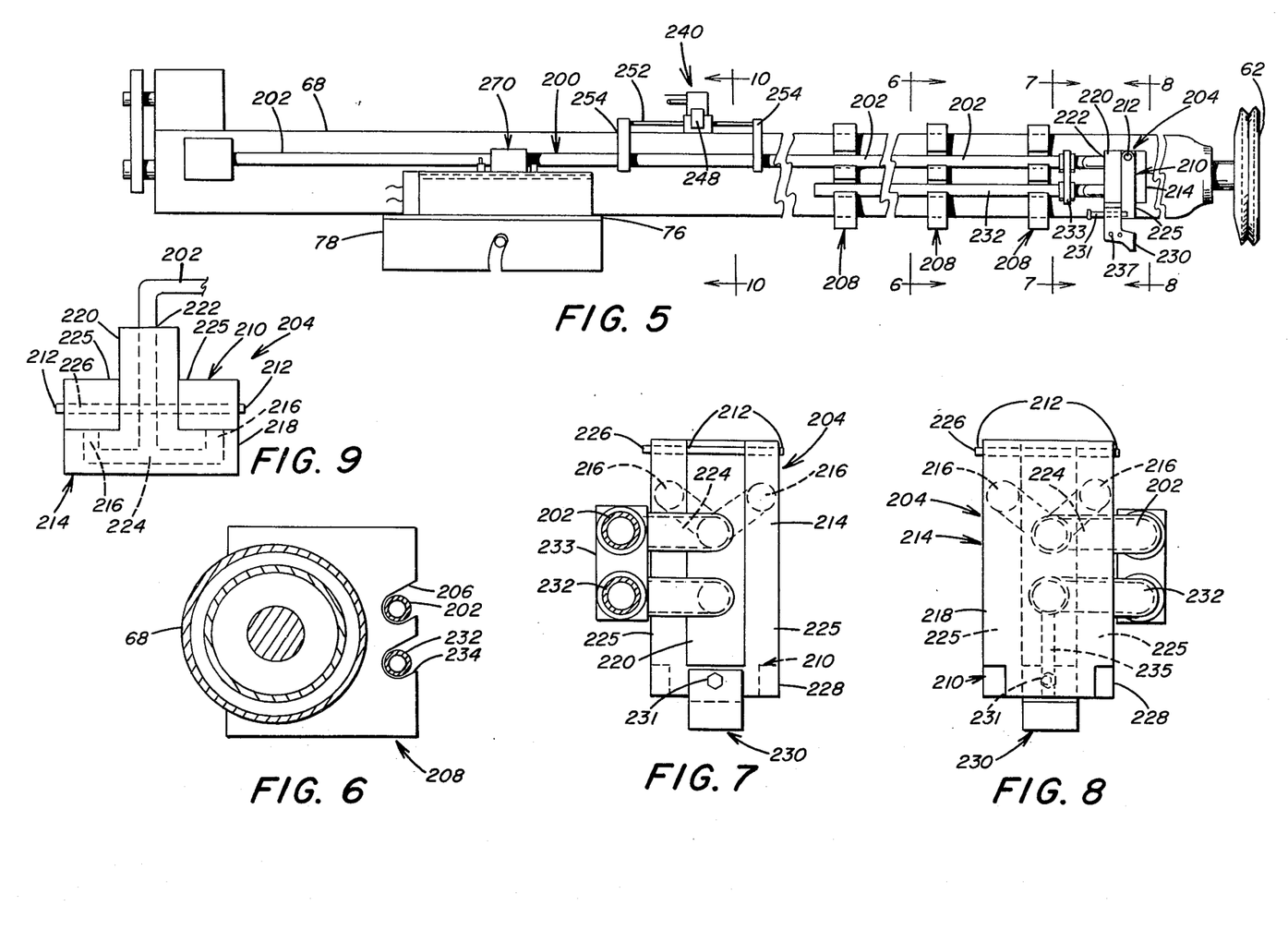
FIG. 5 is a fragmented, side elevated view of the attenuating apparatus having an edge sensor incorporating features of the invention.
FIG. 6 is a view taken along line 6—6 of FIG. 5.
FIG. 7 is a view taking along line 7—7 of FIG. 5.
FIG. 8 is a view taken along line 8—8 of FIG. 5.
FIG. 9 is a top elevated view of a ribbon edge contactor incorporating features of the invention.

Mounted on each attenuating apparatus are edge detectors 200, incorporating features of the invention. The edge detectors 200 are similar in construction and the discussion will be directed to the edge detector on the attenuating apparatus at the left side of the forming chamber 20 as shown in FIG. 2. With reference to FIG. 5, the edge detector 200 includes a pipe 202 conveniently mounted to the barrel 68 of the attenuating apparatus for moving a fluid to edge sensor 204 conveniently mounted on the end of the pipe 202 in spaced relation to the attenuating wheel 62. Although not limiting to the invention, the pipe or conduit 202 is mounted for rotational and sliding motion in groove 206 formed in each of a plurality of plates or brackets 208 conveniently secured in spaced relation to one another on the water cooled barrel 68 of the attenuating apparatus (see FIG. 6).

With reference to FIGS. 5 and 7–9, the edge sensor 204 includes an air restrictive member 210 pivotally mounted at 212 to a block 214 to move toward and away from holes 216 to sense the ribbon edge in a manner to be discussed below. The invention is practiced using a graphite block 214 having a generally T-shaped configuration as shown in FIG. 9. The block 214 has a cross member 218 having a height of 4 inches (10.16 centimeters) as viewed in FIG. 8, and a length of 2 ¼ inches (5.715 centimeters) and width of 0.75 inches (1.91 centimeters) as viewed in FIG. 9. Transverse leg 220 of the block 214 has a height of 4 inches (10.16 centimeters) as viewed in FIG. 7, and a length of 2 inches (5.08 centimeters) and width of 1.25 inches (3.175 centimeters) as viewed in FIG. 9. The conduit 202 is threaded at 222 into the leg 220 to move fluid into passageway 224 formed in the block and out of the holes 216 having a diameter of about 0.25 inch (0.635 centimeter) and spaced about 0.5 inch (1.270 centimeter) below the pivot point 212 for instant response of the movement of the restrictive member 210 relative to the holes 216. The air restrictive member 210 is a generally U-shaped graphite member having outer legs 225 which have a height of 4.75 inches (12.07 centimeters) as viewed in FIG. 7 and a length of 2.25 inches (5.175 centimeters) and width of 0.75 inch (1.91 centimeter) as viewed in FIG. 9. The outer legs are pivotally mounted at 212 by a steel pin 226. Middle leg 228 of the air restrictive member 210 has a length of 2.25 inches (5.175 centimeters) as viewed in FIG. 7 and a height and width of 0.75 inch (1.91 centimeter) as would be viewed in FIG. 9. An edge engaging graphite member 230, is mounted on pin 213 which pin 213 is secured or mounted on the middle leg 228 of the air restrictive member 210 as shown in FIG. 5.

Although not limiting to the invention, the edge engaging member 230 may be mounted for rotational or pivotal motion on pin 231 as taught in U.S. Patent Application Ser. No. 393,859 of Paul Kopp, filed even date, and entitled "Ribbon Edge Sensing Device Having Movable Member", which teachings are hereby incorporated by reference. Pivotally mounting the member 230 on the pin 231 provides freedom of movement for the member 230 relative to the ribbon. By way of illustration, if the member 230 remains in contact with the ribbon edge for an extended period of time due to a failure of the system, the friction between the two may result in uncontrollable movement of the edge sensor 204. Further, if for some reason the sensor 204 moves up onto the ribbon surface 66, the pivotal member 230 allows the ribbon and member to move relative to one another without damage to either.

In operation, fluid, e.g., air or nitrogen depending on the atmosphere of the chamber containing the substrate, is moved through the pipe 202 and out of the holes 216 of the T-shaped block 214. If the outer legs 225 of the air restrictive member 210 are spaced from the holes 216, there is a first back pressure, i.e., a non-engaging back pressure that is conveniently sensed in a manner to be discussed below indicating that the member 230 has not engaged the substrate or ribbon edge 54. When the member 230 is in contact with, or has engaged the substrate, or ribbon edge 54, the air restrictive member 210 pivots away from the holes 216 and a second back pressure, i.e., an engaging back pressure less than nonengaging pressure is sensed. As can now be appreciated and in accordance with the teachings of U.S. Pat. No. 3,998,616, the instant invention can be used to determine ribbon width.

In the practice of the invention it may be preferred to remove the edge sensor 204 from service. To this end, a guide member 232, e.g., a pipe similar to the pipe 202 has an end slidably mounted in the transverse leg 220 of the block 214 and is captured in groove 234 of the plate 208 as shown in FIG. 6. The pipes 202 and 232 pass through plate 233 (see FIG. 5) to maintain their spaced relationship. With this arrangement, rotating the pipe 202, e.g., by device 240 (see FIG. 10) to be discussed below, rotates the edge sensor 204 downward as viewed in FIG. 5 into the engaging position or upward as viewed in FIG. 5 out of the engaging position, e.g., non-contacting position.

Although not limiting to the invention, a fluid cooling medium, e.g., nitrogen, may be moved through the pipe 232 into the transverse leg 220 of the block 214 (see FIG. 9), through passageway 235 (see FIG. 8), through a passageway (not shown) in the edge engaging member 230 and out through holes 237 (see FIG. 5) to flush cool the edge engaging member 230 while directing the cooling medium away from the bath to prevent turbulance thereof.

Figure 10:
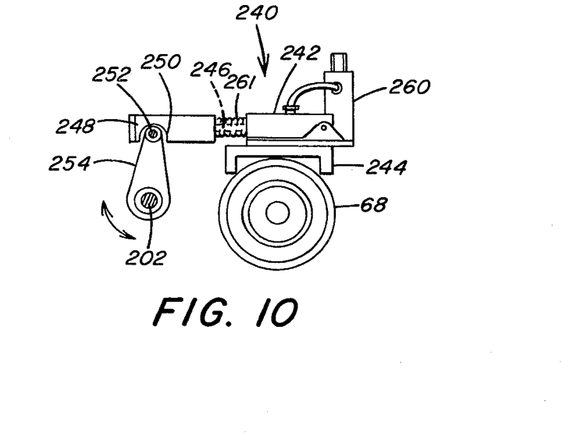
FIG. 10 is a view taken along line 10—10 of FIG. 5.

With reference to FIGS. 5 and 10, the rotating device 240 includes an air cylinder 242 mounted on a platform 244 conveniently mounted on the barrel 68. Ram or piston 246 of the cylinder 242 has a block 248 having a groove 250 for receiving bar 252. The bar 252 has a member 254 adjacent each end which members 254 are secured to the pipe 202. Solenoid regulator 260 controls air flow into the cylinder 242 to control the movement of the piston 246. For example, energizing the regulator 260 moves air into the cylinder 242 to move the piston 246 out of the cylinder 242 to rotate the pipe 202 in a counterclockwise direction as viewed in FIG. 10 to move the edge sensor 204 downward as viewed in FIG. 5 into the engaging or contacting position. When the regulator 260 is de-energized springs 261 null the piston 246 into the cylinder 242 to rotate the pipe 202 in a clockwise direction to move the edge sensor 204 upward as viewed in FIG. 5 into the non-contacting position.

Referring now to FIGS. 4 and 5, the pipe 202 is moved along a reciprocating path to displace the edge sensor 204 relative to the attenuating wheel 62 by linear displacement device 270. With specific reference to FIG. 4, the displacement device includes a platform 272 threadably mounted on threaded shaft 274 rotatably captured between a pair of uprights 276 secured on the plate 76. A clamp 278 secured on the pipe 202 is captured between pegs 280 secured on the platform 272. With this arrangement, the pipe 202 can be rotated by the rotating device 240 while controllably moved along the reciprocating path by energizing motor 282 to rotate the shaft 274. For example, rotating the shaft 274 in a first direction moves the edge contacting device to the right as viewed in FIG. 5 to decrease the distance between the edge sensor 204 and the wheel 62. Rotating the shaft 274 in the reverse direction moves the pipe 202 to the left as viewed in FIG. 5 away from the wheel 62 to increase the spaced distance between the edge sensor 204 and attenuating wheel 62. The direction and amount of displacment is measured by a linear movement monitorial device 290 mounted on the carriage structure. The device 290 is similar to the device 138 and has one end of its cable 292 connected to arm 291 secured to the pipe 202 with portions of the cable 292 wound on wheel 294 mounted on potentiometer stem 296. Displacement of the pipe 202 is sensed by output of the potentiometer 298 in a similar manner as the output of the potentiometer 144 to give direction and displacement of the edge sensor 204.

Figure 11:
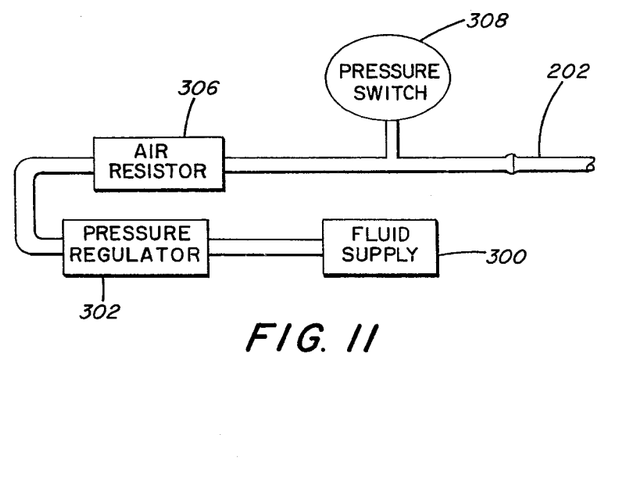
FIG. 11 is a schematic illustrating a control system incorporating features of the invention for determining position of the ribbon edge in accordance with the teachings of the invention.

With reference to FIGS. 1–11 as required, in the practice of the invention, the solonoid regulator 260 is de-energized to rotate the pipe 202 in a clockwise direction as viewed in FIG. 10 to position the edge sensor 204 in the non-engaging position. The motor 282 (FIG. 4) is energized to position the edge sensor 204 about 4 inches (10.16 centimeters) from the wheel. The output of the potentiometer 298 is adjusted to show a spacing of about 5 inches (12.7 centimeters) between the engaging member 230 and the wheel 62 for reasons discussed below. The above is repeated on every attenuating apparatus. The barrel 68 of each attenuating apparatus 52 is mounted through a respective bay 33 in the chamber wall 20 (see FIG. 1). Thereafter, the attenuating wheel 62 of the attenuating apparatus 68 is rotated and moved into engagement with the ribbon surface 66 (see FIG. 2). To measure the nip width, the solonoid regulator 260 (see FIG. 10) is energized to move the piston 246 out of the cylinder 242 to move the pipe 202 and edge sensor 204 into the engaging or measuring position. With reference to FIG. 11, nitrogen from the supply 300 moves through pressure regulator 302 set at about 15 pounds (6.804 kilograms) through resistor 306 passed pressure switch 308 and into the pipe 202. The resistor 306 prevents the pressure regulator 302 from restoring the pressure in pipe 202 during the sensing operation. The member 225 overlays the holes 216 under the force of gravity thereby restricting the nitrogen flow through the holes 216. This back pressure is sensed by the pressure switch 308. The motor 282 (FIG. 4) is energized to move the pipe 202 to the right to move the edge engaging member 230 into engagement with the ribbon edge. As the pipe 202 moves to the right as viewed in FIG. 4, the wheel 294 rotates in a first direction, e.g., a clockwise direction to roll in the cable 292. When the edge engaging member 230 engages the ribbon edge, the air restrictive member 210 pivots to the left as viewed in FIG. 5 allowing the nitrogen, to escape from the holes 216. The resulting increased flow decreases the back pressure in pipe 202 sensed by the pressure switch 308. Thereafter, the motor 282 is reversed to move the pipe 202 to the left as viewed in FIG. 5 to move the edge engaging member 230 to the left a fixed distance, e.g., about 1 inch (2.54 centimeters). The output of the potentiometer 298 is sensed. If it is at the 5 inches (12.7 centimeter) mark, the nip width is about 4 inches (10.16 centimeters). After a time period, e.g., about 1 minute, the above is repeated to determine ribbon width.

If the nip width remains at 4 inches (10.16 centimeters), no further action is required. On the other hand, if the nip width is determined to be greater than about 4 inches (10.16 centimeters), e.g., about 4.5 inches (11.43 centimeters), the potentiometer has an output equal to about 5.5 inches (13.97 centimeters) and appropriate action is taken to decrease the nip width. Further, if the nip width is determined to be less than 4 inches (10.16 centimeters), e.g., about 3 inches (7.62 centimeters) the nip width is below a desired nip width and appropriate action is taken, e.g., as taught in U.S. Pat. No. 3,998,616, which teachings are hereby incorporated by reference. As will be appreciated, the edge detector of the instant invention may be used without the attenuating device.

Although not limiting to the invention, it is a feature of the invention that the rotating device 240 operates to rotate the edge sensor 204 out of contact with the ribbon edge should the ribbon width precipitously increase during the sensing operation. For example, if the ribbon width should increase during the brief interval between the sensing steps described above and contact the edge engaging member 230, the decreased back pressure is sensed by the pressure switch 308 causing the edge sensor 204 to move to the left as shown in FIG. 5 the predetermined distance, e.g., about 1 inch (2.54 centimeters). The above is repeated each time the ribbon edge contacts the edge sensor 204. Should the ribbon width continuously increase, the edge sensor 204 continues to move to the left, away from the laterally moving ribbon edge until the extension limit of pipe 202 is reached, e.g., the plate 233 contacts the bracket 208. When this occurs, the regulator 260 is conveniently energized to operate the rotating device 240, shown in FIG. 10 and discussed above, to rotate the edge sensor 204 upward out of the edge contacting position to permit free lateral movement of the ribbon without damaging the edge sensor 204. In addition, an alarm may conveniently be provided to signal a precipitous increase in ribbon width.

Figure 12:
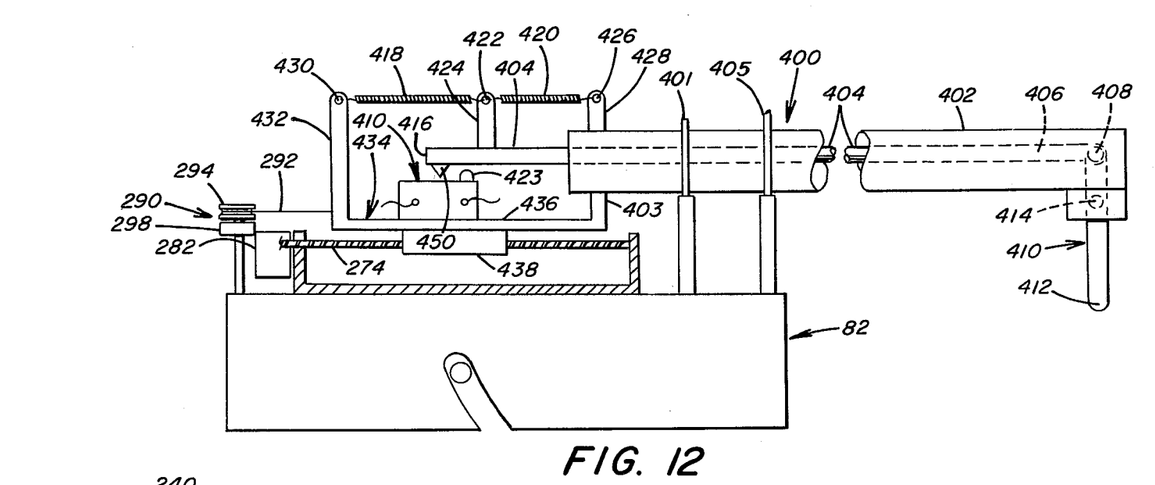
FIG. 12 is a fragmented side elevated view of an alternate embodiment of a ribbon edge detector incorporating features of the invention.

With reference to FIG. 12, there is shown another embodiment of an edge detector incorporating features of the invention. Edge detector 400 shown in FIG. 12 includes a hollow barrel 402 having one end secured at 403 to the platform 434. The barrel has a rod 404 slidably mounted therein. One end of the rod, e.g., end 406 is pivotally mounted at 408 to one end of a finger 410. The finger 410 has the opposite end or fingertip 412 extending out of the barrel 402 for contacting the ribbon edge in a manner to be discussed below. The finger 410 is pivotally mounted at 414 intermediate its end for energizing detector 410 when the ribbon edge is contacted. The barrel 402 is mounted in spaced yokes 401 and 405 which are secured to the carriage 82 of the attenuating apparatus 52. End 416 of the rod 404 extends beyond the barrel 402 and is held in an equilibrium position by a pair of springs 418 and 420. For example, end 422 of each spring 418 and 420 is captured on post 424 secured to the rod 404 with the other end 426 of the spring 420 captured on post 428 mounted on the barrel 402 and the other end 430 captured on post 432 of platform 434. When the rod 404 is in an equilibrium position as determined by the springs 418 and 420, the finger 410 is generally in a vertical position as shown in FIG. 12 which would be normal to the surface of the molten metal supporting the ribbon. The platform 434 has a base 436 which is secured to a block 438 threadably mounted on the shaft 274. With the above arrangement, the ribbon edge may be detected in the following manner. The motor 282 is energized to move the platform 434 and barrel toward the ribbon edge. When the finger tip 412 engages the ribbon edge, the finger tip pivots around point 414 in a clockwise direction as viewed in FIG. 12 to move the rod 404 to the right as viewed in FIG. 12. As the member 404 moves to the right, contactor 450 on the end of the rod contacts switch 423 of the detector to generate a signal after which the motor 282 is reversed and the procedure discussed regarding the edge detector is repeated to determine ribbon edge displacement.

As can now be appreciated, the edge detectors of the instant invention may be used to measure ribbon width or locate the ribbon in the forming chamber as taught in U.S. Pat. No. 3,998,616.

The material used for constructing the conduit alignment pipe and edge sensor are not limiting to the invention. However, it is recommended that certain consideration be given to the material selected, for example, the edge detector should be of such a material as to withstand the hostile environment of the forming chamber, or other chamber in which it is used. For example, in a glass forming chamber, carbon has been found to be a suitable material. Further, the material should be one that does not restrict the flow of the glass or does not adhere to the glass. Carbon has been found suitable in these situations also, and therefore, the device constructed in the practice of the invention was carbon.

As can be appreciated, the invention is not limited to the manner of use of the devices for sensing the glass ribbon. They may be used in combination with attenuating devices or in the alternative used separately to sense the presence or absence of the ribbon. In this regard, when the edge detectors are used alone, they may be mounted on a device similar to that taught in U.S. Patent Application Ser. No. 210,447, filed on Nov. 26, 1980 in the name of Hugh Shaw, which teachings are hereby incorporated by reference.

As can be appreciated, the above examples are presented for illustration purposes only and are not intended to limit the invention.

What is claimed is:

1. A method of measuring sideward displacement of a glass ribbon supported on a molten metal bath contained in a chamber having sidewalls and advancing along a ribbon movement path, comprising:
    advancing edge detecting means in a first direction away from the adjacent chamber sidewall into physical contact with a ribbon edge wherein the measuring path is transverse to the ribbon movement path;
    moving the edge detecting means in a second direction along the movement path away from the ribbon edge toward the chamber sidewall into a first home position;
    at a selected interval repeating said advancing step;
    practicing said moving step to move the edge detecting means away from the ribbon edge into a second home position;
    determining the distance and direction along the measuring path between the first and second home positions to measure sideward displacement of the advancing ribbon.

2. The method as set forth in claim 1, wherein said advancing step, moving step, repeating step, practicing step and determining step are practiced at each side of the ribbon to determine ribbon width.

3. The method as set forth in claim 1, wherein said advancing step, moving step, repeating step, practicing step and determining step are practiced at each side of the ribbon to determine ribbon displacement, relative to centerline of the ribbon movement path.

4. A method of controlling nip width of a glass ribbon supported on a molten metal bath contained in a chamber having sidewalls and advancing along a ribbon movement path, wherein the ribbon is engaged by attenuating means at each side of the ribbon, the attenuating means includes a ribbon engaging member, and the nip width is the distance from ribbon edge to adjacent ribbon engaging member, comprising the steps of:
    positioning an edge detector a distance from the ribbon engaging member equal to a length which includes desired nip width and a predetermined distance to provide a first home position;
    advancing the edge detector in a first direction along a measuring path away from the adjacent chamber sidewalls into physical contact with the adjacent ribbon edge;
    moving the edge detector in a second direction along the movement path away from the ribbon edge toward the adjacent sidewall the predetermined distance to position the detector in a second home position;
    comparing the first home position to the second home position to determine actual nip width; and
    acting on the attenuating means to provide a predetermined nip width.

5. The method as set forth in claim 4 further including the steps of:
    positioning the edge detector in a stationary position;
    contacting the stationary edge detector by the advancing ribbon moving in a lateral direction relative to the ribbon movement path; and
    thereafter moving the edge detector in the second direction away from the ribbon toward the adjacent sidewall.

6. The method as set forth in claim 4 further including the step of continuously moving the edge detector in the second direction away from the ribbon edge toward the adjacent chamber sidewall as long as the ribbon edge portion is in continuous physical contact with the edge detector.

7. The method as set forth in claim 5 or 6 further including the step of selectively moving the edge detector in an upward direction away from plane containing the ribbon surface when the displacement of the edge detector along the measuring path in the second direction away from the ribbon edge toward the adjacent chamber sidewall is restricted.

8. An apparatus for measuring substrate displacement comprising:
    means for detecting substrate edge, said detecting means including:
        block means having at least one orifice;
        means for moving a fluid under a predetermined pressure out of the at least one orifice;
        means mounting said moving a fluid means for controlling the fluid flow out of said orifice when said block means contacts the substrate edge wherein the fluid moves out of said orifice at a first pressure and wherein said controlling means includes a member pivotally mounted on said block means for movement toward and away from said orifice; and
        means for measuring variations in pressure to determine
    when the ribbon edge is contacted;
    means for moving said detecting means to advance said detecting means in a first direction along a measuring path into contact with the substrate edge, and to retract said detecting means in a second direction along the path a predetermined distance into a home position, said means for moving said detecting means including a pipe having said block means of said detecting means mounted at one end and connectable at the other end to a fluid supply;
    means for activating said means for moving said detecting means at selected intervals; and
    means responsive to the movement of said detecting means for measuring differences in the distance and direction between successive home positions of said detecting means to measure substrate displacement.

9. The apparatus as set forth in claim 8, further including:
    means for rotating said pipe to move said detector downwardly toward the measuring path and upwardly away from the measuring path.

10. The apparatus as set forth in claim 8, wherein said means for moving said detecting means includes a platform for supporting said detecting means and said detecting means includes an outer tube and further including:

- an elongated arm for contacting the substrate edge pivotally mounted between its ends to one end of said outer tube;
- an elongated member slidably mounted on said tube and having a first end mounted to said arm to move said member from the home position toward the substrate, defined as a first direction, when said arm engages the substrate edge;
- biasing means for maintaining said member in an equilibrium position in the measuring path;
- a first contactor mounted adjacent a second end of said elongated member;
- a second contactor mounted on said platform a fixed distance from said first contactor wherein said elongated member is mounted on said platform for movement in the first direction against said biasing means and for movement in a second direction away from the substrate under the action of said biasing means; and
- said activating means includes the first and second contactors to energize said moving means when they engage one another.

11. The apparatus as set forth in claim 8 or 10, wherein said measuring means includes:

potentiometer means connected to said platform; and means for measuring output of said potentiometer means to determine direction and displacement of said detector along the measuring path.

12. The apparatus as set forth in claim 11, further including means for advancing said attenuating means downwardly toward the ribbon and upwardly away from the ribbon.

13. The apparatus as set forth in claim 8, wherein the substrate is a glass ribbon supported on a molten metal bath and advancing along a movement path transverse to the measuring path and further including:

- means for attenuating the ribbon as it advances along the movement path to provide a ribbon of glass having a desired thickness, said attenuating means including a barrel having a glass engaging member mounted at one end;
- said means for moving said detecting means includes a platform and means for slidably mounting said detecting means on said attenuating means with said detecting means spaced from said glass engaging member and said slidably mounting means includes a rod;
- means for mounting said rod on said platform; and
- means for moving said platform to advance said detecting means by way of said rod in a first direction along the measuring path toward the glass engaging member and in a second direction by way of said rod along the measuring path away from the glass engaging member.

* * * * *